(12) United States Patent
Archer et al.

(10) Patent No.: US 11,097,842 B1
(45) Date of Patent: Aug. 24, 2021

(54) UNMANNED AIRCRAFT SYSTEM DETECTION, IDENTIFICATION, AND INTERDICTION

(71) Applicant: Flex Force Enterprises Inc., Portland, OR (US)

(72) Inventors: Cynthia Louise Archer, Sherwood, OR (US); Jacob Ryan Sullivan, Portland, OR (US); Gregory Edward Valentin, Portland, OR (US)

(73) Assignee: Flex Force Enterprises Inc., Portland, OR (US)

( * ) Notice: Subject to any disclaimer, the term of this patent is extended or adjusted under 35 U.S.C. 154(b) by 0 days.

(21) Appl. No.: 17/152,673

(22) Filed: Jan. 19, 2021

Related U.S. Application Data

(60) Provisional application No. 62/995,218, filed on Jan. 17, 2020.

(51) Int. Cl.
| | |
|---|---|
| *B64C 39/02* | (2006.01) |
| *G05D 1/00* | (2006.01) |
| *H04W 12/00* | (2021.01) |
| *G06F 21/00* | (2013.01) |
| *G06F 21/30* | (2013.01) |
| *G06F 21/31* | (2013.01) |
| *G06F 16/9035* | (2019.01) |

(52) U.S. Cl.
CPC ......... *B64C 39/024* (2013.01); *G05D 1/0022* (2013.01); *G05D 1/0033* (2013.01); *G06F 16/9035* (2019.01); *B64C 2201/127* (2013.01); *B64C 2201/145* (2013.01); *B64C 2201/146* (2013.01)

(58) Field of Classification Search
CPC ............ B64C 39/024; B64C 2201/145; B64C 2201/146; B64C 2201/127; G05D 1/0022; G05D 1/0033; G06F 16/9035; G06F 21/00; G06F 21/30; G06F 21/31; H04W 12/00; H04W 12/08; H04W 12/082; H04W 12/084; H04W 12/086; H04W 12/088; H04W 12/10; H04W 12/30; H04K 3/00; H04K 2203/00
See application file for complete search history.

(56) References Cited

U.S. PATENT DOCUMENTS

| | | | |
|---|---|---|---|
| 8,983,682 B1* | 3/2015 | Peeters ................. | B64C 39/024 701/2 |
| 9,514,589 B2* | 12/2016 | Raina ....................... | G07C 9/15 |
| 9,552,466 B2* | 1/2017 | Lowe .................... | H04W 12/08 |
| 9,554,277 B2* | 1/2017 | G ........................ | G07C 9/00571 |
| 10,310,498 B2* | 6/2019 | Petruzzelli ............ | B64C 39/024 |
| 10,665,047 B1* | 5/2020 | Terp ........................ | G07C 9/21 |
| 2014/0152507 A1* | 6/2014 | McAllister ............. | H01Q 1/362 342/126 |
| 2015/0381592 A1* | 12/2015 | Khazan ............... | H04L 63/0428 713/171 |

(Continued)

*Primary Examiner* — Yonel Beaulieu
(74) *Attorney, Agent, or Firm* — The Law Offices of Raul D. Martinez, PC (57) ABSTRACT

The devices and methods described herein integrate security and/or recording mechanisms into unmanned vehicle interdiction devices to prevent unauthorized use and to record information related to operation of the unmanned vehicle interdiction device, identification of an unmanned vehicle, location of the unmanned vehicle, and operation of the unmanned vehicle.

30 Claims, 3 Drawing Sheets

(56) References Cited

U.S. PATENT DOCUMENTS

| | | | |
|---|---|---|---|
| 2016/0292696 A1* | 10/2016 | Gong | G08G 5/0052 |
| 2016/0300187 A1* | 10/2016 | Kashi | G06Q 10/0836 |
| 2017/0364065 A1* | 12/2017 | Petruzzelli | G08G 5/0069 |
| 2018/0211263 A1* | 7/2018 | Gong | G06F 21/6227 |
| 2018/0253092 A1* | 9/2018 | Trapero Esteban | H04W 12/06 |
| 2018/0366817 A1* | 12/2018 | Sung | H01Q 1/521 |
| 2019/0199756 A1* | 6/2019 | Correnti | H04W 12/08 |
| 2019/0278897 A1* | 9/2019 | Zhang | G06Q 50/30 |
| 2019/0373468 A1* | 12/2019 | Amisano | G08C 17/02 |
| 2020/0008059 A1* | 1/2020 | Fox | H04W 12/122 |
| 2020/0223396 A1* | 7/2020 | Yi | G08G 1/202 |
| 2020/0241575 A1* | 7/2020 | Meisenholder | G05D 1/12 |
| 2020/0288895 A1* | 9/2020 | Bennet | H04W 12/03 |
| 2020/0349852 A1* | 11/2020 | DiCosola | G06Q 10/0832 |
| 2021/0021423 A1* | 1/2021 | Latorre | G16H 10/60 |

\* cited by examiner

UNMANNED AIRCRAFT SYSTEM DETECTION, IDENTIFICATION, AND INTERDICTION

CLAIM OF PRIORITY

The present application claims priority to U.S. Patent Application No. 62/995,218, entitled "UNMANNED AIRCRAFT SYSTEM DETECTION, IDENTIFICATION, AND INTERDICTION" and filed Jan. 17, 2020, which is assigned to the assignee hereof and hereby expressly incorporated by reference in its entirety.

FIELD

The subject matter described herein relates to devices and methods for detecting, identifying, and disrupting operation of unmanned vehicles and more particularly to security mechanisms to prevent unauthorized use of such devices.

BACKGROUND

The recent increase in the availability and use of unmanned aircraft systems (UASs), drones, and remote-controlled model aircraft raises safety and security concerns, both for civilians and governmental agencies including the Department of Defense (DoD). These recreational aircraft can be co-opted for malicious intent by terrorists and criminals. More specifically, they can be used to threaten the safety of civilians, especially at large social gatherings (e.g. Olympics), by terrorist organizations.

A UAS can be used, either intentionally or through ignorance, to impede the efforts of first responders in emergency situations. For example, private drones have been known to hamper firefighters battling wildfires that are common across the western United States every summer. By preventing firefighters from effectively containing a wildfire, these UASs cause property loss, injuries, and potential loss of life.

News services have also reported numerous instances of unauthorized UASs flying and crashing over political or public gatherings or into restricted airspace. These incidents represent a public safety risk.

SUMMARY

The devices and methods described herein integrate security and/or recording mechanisms into unmanned vehicle interdiction devices to prevent unauthorized use and to record information related to operation of the unmanned vehicle interdiction device, identification of an unmanned vehicle, location of the unmanned vehicle, and operation of the unmanned vehicle.

In one example, an unmanned vehicle interdiction device comprises a hand-held housing encapsulating a control unit comprising memory and at least one processor, an unmanned vehicle interdiction mechanism coupled to the control unit to selectively emit signals to disrupt operation of an unmanned vehicle, and a credential detector coupled to the control unit having an interface to detect and validate access keys. The control unit, in response to receiving a signal from the credential detector indicating that an access key has been validated, sends a signal to enable the unmanned vehicle interdiction mechanism.

In some examples, the memory stores a database of authorized users of the unmanned vehicle interdiction device, and the credential detector validates the access key based on whether a user associated with the access key is identified as an authorized user in the database of authorized users.

In some examples, the unmanned vehicle interdiction device further comprises a communications interface configured to: query a remote database of authorized users to determine whether a user associated with the access key is an authorized user, and receive an indication that the user associated with the access key is identified as an authorized user in the remote database of authorized users. The credential detector validates the access key based on the received indication that the user associated with the access key is identified as an authorized user in the remote database of authorized users.

In some examples, the unmanned vehicle interdiction mechanism comprises at least one of the following: a radio frequency jammer, a Global Navigation Satellite System (GNSS) signal replacement mechanism, and a signal generator configured to generate signals from a simulated satellite constellation that conflict with signals from an actual satellite constellation.

In some examples, the access key comprises at least one of the following: a Common Access Card (CAC), a Personal Identity Verification (PIV) credential, a key that contains an identity of a user encrypted with a public key of the unmanned vehicle interdiction device, and a key that contains an identity of a user encrypted with a private key of the user.

In some examples, the unmanned vehicle interdiction device further comprises a recording mechanism coupled to the memory to record data related to at least one of the following: operation of the unmanned vehicle interdiction device, identification of an unmanned vehicle, location of the unmanned vehicle, and operation of the unmanned vehicle.

In some examples, the unmanned vehicle interdiction device further comprises an optical sensor coupled to the control unit and the recording mechanism to record, in response to receiving a signal from the control unit, at least one of the following: images and video associated with the unmanned vehicle, an identifier located on a surface of the unmanned vehicle, and a location in which the unmanned vehicle is being operated.

In some examples, the unmanned vehicle interdiction device further comprises: a Global Navigation Satellite System (GNSS) receiver coupled to the recording mechanism to record a geographical location of the unmanned vehicle interdiction device, and a compass coupled to the recording mechanism to record a heading of the optical sensor.

In some examples, the unmanned vehicle interdiction device further comprises a radio frequency sensor coupled to the recording mechanism to record identification information broadcast from the unmanned vehicle in a radio frequency signal.

In some examples, the unmanned vehicle interdiction device further comprises an electro-optical sensor coupled to the recording mechanism to record identification information broadcast from the unmanned vehicle in at least one of the following: a visible signal, a near-infrared signal, and a thermal laser signal.

In some examples, the recording mechanism is configured to, in response to activation of the unmanned vehicle interdiction mechanism, automatically log information related to operation of the unmanned vehicle interdiction device by the authorized user.

In some examples, the recording mechanism is configured to, upon receipt of an input from the authorized user that indicates a request to log information, log information related to a current operational state of the unmanned vehicle interdiction device.

In some examples, the recording mechanism is configured to, upon receipt of an input from the authorized user that indicates a request to log information, record information related to a current operational state of at least one unmanned vehicle operating within range of the unmanned vehicle interdiction device.

In some examples, the recording mechanism is configured to, in response to activation of the unmanned vehicle interdiction mechanism, automatically log information related to at least one of the following: identification of an unmanned vehicle, location of the unmanned vehicle, and operation of the unmanned vehicle.

In some examples, the unmanned vehicle interdiction device further comprises an unmanned vehicle detection mechanism coupled to the control unit configured to detect at least one of the following signals that are associated with an unmanned vehicle: a control signal, a video signal, and a telemetry signal.

In some examples, the recording mechanism is configured to, in response to detection of an unmanned vehicle by the unmanned vehicle detection mechanism, automatically log information related to at least one of the following: identification of the unmanned vehicle, location of the unmanned vehicle, and operation of the unmanned vehicle.

In another example, an unmanned vehicle interdiction device comprises a hand-held housing encapsulating a control unit comprising memory and at least one processor, an unmanned vehicle interdiction mechanism coupled to the control unit to selectively emit signals to disrupt operation of an unmanned vehicle, and a security mechanism coupled to the control unit having an interface to validate access keys. The control unit, in response to receiving a signal from the security mechanism indicating that an access key has been validated, sends a signal to enable the unmanned vehicle interdiction mechanism.

In some examples, the access key comprises at least one of the following: a mechanical key, a radio frequency identification (RFID) tag, a transponder key, a smart key, and an electronic card or stick.

In a further example, a method is performed at an unmanned vehicle interdiction device comprising an unmanned vehicle detection mechanism and an unmanned vehicle interdiction mechanism configured to selectively emit signals to disrupt operation of an unmanned vehicle. The method comprises detecting presentation of a valid access key by an authorized user and, in response to presentation of the valid access key, enabling the unmanned vehicle interdiction mechanism.

In some examples, the method further comprises validating the access key based on a determination that a user associated with the access key is identified as an authorized user in a database of authorized users.

In some examples, the method further comprises logging data related to at least one of the following: operation of the unmanned vehicle interdiction device, identification of an unmanned vehicle, location of the unmanned vehicle, and operation of the unmanned vehicle.

In some examples, the logging of data is automatically performed in response to activation of the unmanned vehicle interdiction mechanism.

In some examples, the logging of data is automatically performed in response to detection of an unmanned vehicle by the unmanned vehicle detection mechanism.

DETAILED DESCRIPTION

Currently, unmanned aircraft system (UAS) interdiction devices can only be used in the United States for Congressionally approved applications by federal agencies. Concerns about safety, side effects, and appropriate use have caused lawmakers and the policy makers for federal agencies to prevent state and local law enforcement, firefighters, and first responders from using these UAS interdiction devices to disable, disrupt, disorient, and/or take control of a UAS that is being operated in an unlawful or unsafe manner.

Most methods for UAS interdiction have side effects. For example, jamming also interrupts the operation of legitimate wireless devices, such as computers or navigation equipment. Thus, UAS interdiction devices should only be operated by individuals who have the necessary training and authorization to do so.

Moreover, in order to prosecute the operator of a dangerously operated UAS, it is necessary to provide physical evidence of the incident. Recorded imagery, with date, time, and location information are crucial evidentiary data. Since the Federal Aviation Administration (FAA) requires all registered UASs to display their registration number on the outside of the craft, a camera on the UAS interdiction device can also be used to capture the registration number or serial number from a recovered UAS. This same data enables post operation analysis and accountability of UAS interdiction device operators, addressing public concerns of appropriate use of force.

Given the foregoing considerations, the devices and methods described herein integrate security and/or recording mechanisms into unmanned vehicle interdiction devices to prevent unauthorized use and to record information related to operation of the unmanned vehicle interdiction device, identification of an unmanned vehicle, location of the unmanned vehicle, and operation of the unmanned vehicle.

As used herein, the term "unmanned vehicle" (UV) can refer to any unmanned vehicle. For example, unless otherwise specified, an unmanned vehicle could be an unmanned aerial vehicle (UAV) or unmanned aircraft system (UAS) such as a drone, an airplane, or a rotorcraft; an unmanned land-based vehicle such as a car, truck, tank, or armored vehicle; an unmanned watercraft such as a boat or riverine craft; and an unmanned amphibious vehicle.

Although the different examples of unmanned vehicle interdiction devices and methods of using the unmanned vehicle interdiction devices may be described separately, any of the features of any of the examples may be added to, omitted from, or combined with any other example.

Figure 1:
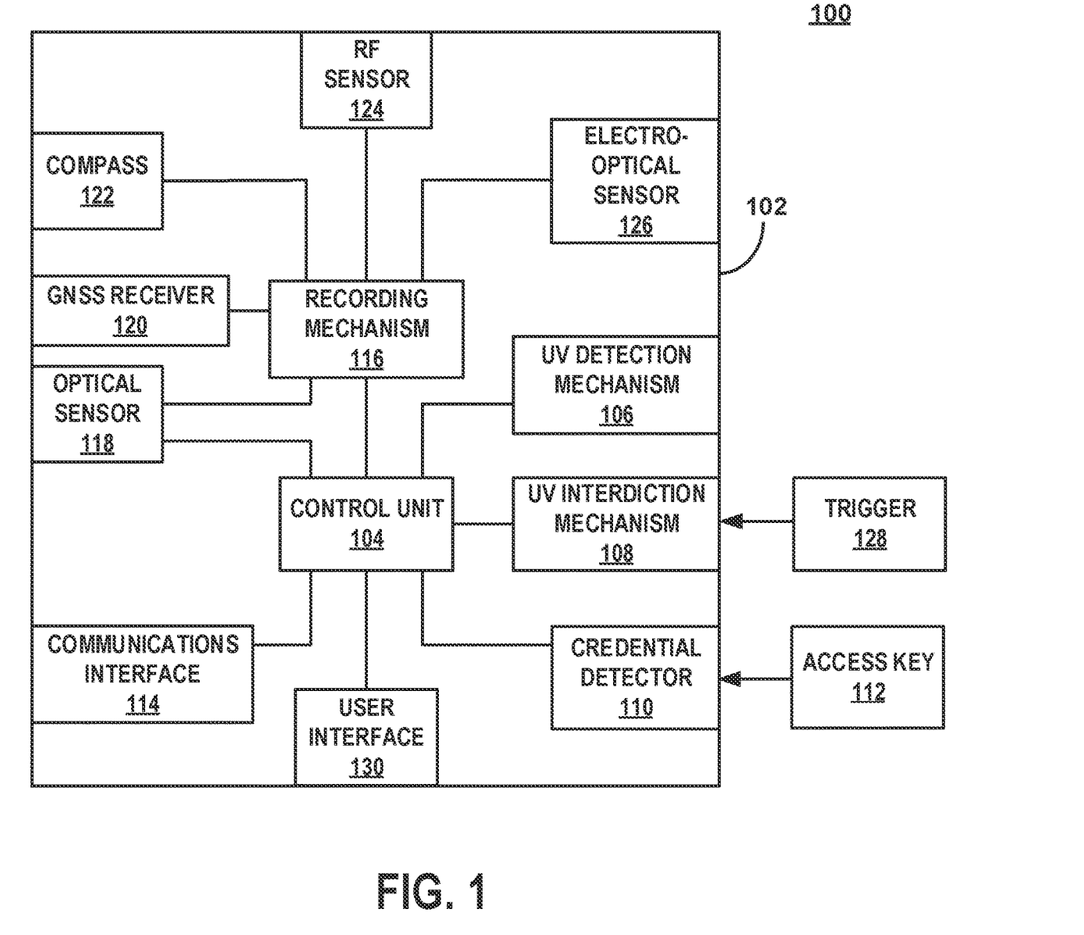
FIG. 1 is a block diagram of an example unmanned vehicle interdiction device that requires presentation of a valid access key in order to enable the functionality of an unmanned vehicle interdiction mechanism of the unmanned vehicle interdiction device.

FIG. 1 is a block diagram of an example unmanned vehicle interdiction device that requires presentation of a valid access key in order to enable the functionality of an unmanned vehicle interdiction mechanism of the unmanned vehicle interdiction device. Unmanned vehicle interdiction device 100 comprises hand-held housing 102, which encapsulates control unit 104, unmanned vehicle (UV) detection mechanism 106, unmanned vehicle (UV) interdiction mechanism 108, and credential detector/security mechanism 110. Unmanned vehicle interdiction device 100 may also include communications interface 114, recording mechanism 116, optical sensor 118, Global Navigation Satellite System (GNSS) receiver 120, compass 122, radio frequency (RF) sensor 124, electro-optical sensor 126, trigger 128, and user interface 130.

Control unit 104 comprises memory and at least one processor. UV detection mechanism 106, which is coupled to control unit 104, is configured to detect at least one of the following signals that are associated with an unmanned vehicle: a control signal, a video signal, and a telemetry signal. In some examples, UV detection mechanism 106 utilizes a set of directed antennas and receivers to monitor the radio frequency bands assigned by the Federal Communications Commission (FCC) for unmanned vehicle communications, command, and control in order to locate, engage, and defeat unmanned vehicles. The assigned frequency bands currently include: the 430-450 MHz band, the 920 MHz band, the 2.4 GHz band, and the 5.8 GHz band. These bands are listed as examples, and other appropriate frequencies may be used instead of or in addition to these bands. Each receiver output is directed to a circuit, which converts the received power to a voltage. This voltage is digitized using an analog-to-digital converter (ADC) and the resulting digital values are read by control unit 104, which interprets the digital value representing received signal strength to produce a light bar display. The light bar can be implemented as discrete LEDs, a light bar panel, or a simulated light bar shown on a digital display panel on user interface 130. The number of lights or height of the bar indicates signal strength in each communication band at the unmanned vehicle interdiction device's current pointing direction. The signal strength indication may either be a raw value or the amount above an integrated background estimate.

As described above, when UV detection mechanism 106 detects a signal within one of the assigned radio frequency bands, the operator receives an indication on a display of user interface 130. This indication can take the form of a strength signal, direction, or both that are displayed as the operator changes the direction of the unmanned vehicle interdiction device 100. The system can optionally include advanced pattern recognition, which classifies strong sources as likely unmanned vehicles. This information, along with pointing information provided by compass 122, is displayed to the operator on user interface 130, aiding in quickly locating unmanned vehicle threats in radio frequency or visually cluttered environments.

In the example shown in FIG. 1, user interface 130 is an interface by which a user of unmanned vehicle interdiction device 100 can (1) obtain information regarding the status of unmanned vehicle interdiction device 100, (2) detect the presence of an unmanned vehicle within the effective range of unmanned vehicle interdiction device 100, and (3) enter commands, instructions, and/or selections pertaining to the operation of unmanned vehicle interdiction device 100. For example, regarding the status of unmanned vehicle interdiction device 100, user interface 130 may be configured to display information indicating (1) the remaining charge of a battery located within, or connected to, unmanned vehicle interdiction device 100, (2) the current operating state of unmanned vehicle interdiction device 100, and/or (3) whether unmanned vehicle interdiction device 100 is currently transmitting jamming signals.

Regarding detection of an unmanned vehicle, user interface 130 may, in some examples, be configured to display information indicating the presence, strength, type, and/or direction of detected radio signals associated with operation of an unmanned vehicle. In still further examples, user interface 130 may be configured to display information indicating an estimated range and/or direction of the unmanned vehicle from unmanned vehicle interdiction device 100.

Regarding entry of user commands/selections, user interface 130 may be configured, in some examples, to receive from a user, signal generation parameters associated with the desired operational state of unmanned vehicle interdiction device 100. In certain examples, a user may configure unmanned vehicle interdiction device 100 to operate in a state in which the jamming signal transmission duration is either "continuous" transmission of the jamming signal or only when a user activates transmission (e.g., by pressing a button/trigger 128 on unmanned vehicle interdiction device 100).

UV interdiction mechanism 108, which is coupled to control unit 104, selectively emits signals to disrupt operation of an unmanned vehicle. In some examples, UV interdiction mechanism 108 comprises at least one of the following: a radio frequency jammer, a GNSS signal replacement mechanism, and a signal generator configured to generate signals from a simulated satellite constellation that conflict with signals from an actual satellite constellation. In the examples in which UV interdiction mechanism 108 comprises a radio frequency (RF) jammer, the RF jammer may be any jammer that is designed to disrupt (1) command signals from the controller to the unmanned vehicle, (2) telemetry and video signals from the unmanned vehicle to the controller, and/or (3) navigation signals from overhead satellites. In some examples, the RF jammers operate by flooding the command and navigation frequency bands with either random or structured noise, overwhelming the unmanned vehicle's receivers, so that the command and/or navigation signals are buried in the noise so the unmanned vehicle cannot detect the true satellite navigation signals. With loss of operator control and/or navigation, the unmanned vehicle then resorts to default behavior, such as landing, hovering, or returning to its base.

Global Navigation Satellite System (GNSS) is an umbrella term that encompasses all global satellite positioning systems. This includes constellations of satellites orbiting over the Earth's surface and continuously transmitting signals that enable users to determine their position. The Global Positioning System (GPS) is one example of a Global Navigation Satellite System. Besides GPS, there are other satellite navigation systems, such as Russia's Global Navigation Satellite System (GLONASS), China's BeiDou Navigation Satellite System (BDS), and the European Union's Galileo. Japan's Quasi-Zenith Satellite System (QZSS) is a GPS satellite-based augmentation system to enhance GPS's accuracy, with satellite navigation independent of GPS scheduled for 2023. India has the Indian Regional Navigation Satellite System (IRNSS), also known as Navigation with Indian Constellation (NAVIC), an autonomous regional satellite navigation system that provides accurate real-time positioning and timing services, with plans to expand to a global version in the long-term.

In the examples in which UV interdiction mechanism 108 comprises a GNSS signal replacement mechanism, the goal is to take control of an unmanned vehicle by broadcasting false GNSS signals configured to interfere with the unmanned vehicle's navigation. The GNSS signal replacement mechanism generates a convincing pirate signal, which is a signal that is used to capture and control navigation of the target unmanned vehicle. More specifically, the false (e.g., pirate) GNSS signal is matched to the true signals from the GNSS satellites. By providing a stronger GNSS signal to the unmanned vehicle, the jamming system tricks the unmanned vehicle's signal tracking loops to lock onto the set of false GNSS signals. The navigation signals are then manipulated to allow a pirate operator to gain operational control of the unmanned vehicle.

In the examples in which UV interdiction mechanism 108 comprises a signal generator configured to generate signals from a simulated satellite constellation that conflict with signals from an actual satellite constellation, the signal generator generates a conflicting/competing signal to the actual GNSS signals. In some examples, the signal generator (1) generates signals from a simulated satellite constellation, wherein the signals from the simulated satellite constellation conflict/compete with signals from an actual satellite constellation, and (2) transmits the signals from the simulated satellite constellation towards an unmanned vehicle using a directional antenna.

Credential detector 110, which is coupled to control unit 104, has an interface to detect and validate access keys 112. In order to enable UV interdiction mechanism 108 and promote appropriate use, a user presents access key 112 for validation by credential detector 110, as will be discussed more fully below. The concept of "presenting" or "presentation" of access key 112 may take any suitable manner of submitting access key 112 for validation, which will be dependent on which type of access key is being utilized. For example, "presenting" a mechanical access key may involve a user inserting the mechanical key into a lock to validate the access key, and in some examples, the user would additionally be required to turn the key to validate the access key. In other examples, "presenting" a key that utilizes radio frequency identification (RFID) technology may involve a user placing the access key in a location that is close enough to unmanned vehicle interdiction device 100 to be read by an RFID interrogation signal. In further examples, "presenting" a key card may include inserting the key card into, or swiping the key card through, unmanned vehicle interdiction device 100.

If unmanned vehicle interdiction device 100 does not recognize access key 112, or no access key is provided, UV interdiction mechanism 108 cannot be activated, significantly reducing the risk of irresponsible use. Regardless of whether access key 112 is validated or not, the user's identity, as indicated by access key 112, can be logged in memory of unmanned vehicle interdiction device 100 or logged in a remote data source accessible via a wireless network.

In some examples, the access key is associated with the user, taking the form of a Common Access Card (CAC) or a Personal Identity Verification (PIV) credential. A CAC is a "smart" card about the size of a credit card, which is the standard identification for active-duty uniformed Service personnel, Selected Reserve, Department of Defense (DoD) civilian employees, and eligible contractor personnel. It is also the principal card used to enable physical access to buildings and controlled spaces, and it provides access to DoD computer network and systems.

A Personal Identity Verification (PIV) credential is a US Federal governmentwide credential used to access Federally controlled facilities and information systems at the appropriate security level. PIV credentials have certificates and key pairs, pin numbers, biometrics like fingerprints and pictures, and other unique identifiers. When put together into a PIV credential, it provides the capability to implement multi-factor authentication for networks, applications and buildings.

These types of access keys use public/private key encryption to securely identify authorized users and the current user. More specifically, these types of access keys contain the user identity encrypted with the unmanned vehicle interdiction device's public key. When the access key card (e.g., CAC or PIV) is inserted into the unmanned vehicle interdiction device, the certificate from the access key is read and decrypted by the unmanned vehicle interdiction device's private key. The private key is stored permanently on the unmanned vehicle interdiction device in secure memory. If the access key card is associated with an authorized user, credential detector 110 sends a signal to control unit 104 indicating that access key 112 has been validated. In response to receiving the signal indicating that access key 112 has been validated, control unit 104 sends a signal to enable unmanned vehicle interdiction mechanism 108. Although the foregoing discussion focused on CACs and PIV credentials, the access key may be any other key, besides a CAC or a PIV credential, that contains an identity of a user encrypted with a public key of the unmanned vehicle interdiction device, in other examples.

In other examples, the access key is associated with the users, rather than the unmanned vehicle interdiction device. In these examples, the unmanned vehicle interdiction device is loaded with the public keys of authorized users. When the user's access key (e.g., identity card) is inserted in the unmanned vehicle interdiction device, the access key provides the user's identity, which is encrypted with the user's private key. The unmanned vehicle interdiction device looks up the user's public key in its database and can decrypt the encrypted identity with that public key. The decrypted identity and user's identity are then compared. If the identities match, the user is determined to be an authorized user, and credential detector 110 sends a signal to control unit 104 indicating that access key 112 has been validated. In response to receiving the signal indicating that access key 112 has been validated, control unit 104 sends a signal to enable unmanned vehicle interdiction mechanism 108.

As mentioned above, credential detector 110 may access a database of authorized users to validate an access key that is presented by a user. In some examples, a database of authorized users of unmanned vehicle interdiction device 100 is stored in the memory of unmanned vehicle interdiction device 100, and credential detector 110 validates access key 112 based on whether a user associated with access key 112 is identified as an authorized user in the database of authorized users. In some examples, the on-board database of authorized users can be implemented using an electrically erasable programmable read only memory (EEPROM), which can be re-programmed in circuit. For example, unmanned vehicle interdiction device 100 can include a slot for a physical administrative key, which when inserted will allow the database to be re-programmed. This administrative key can be associated with unmanned vehicle interdiction device 100 and may be either a mechanical key that closes a circuit or an electronically readable key. In further examples, unmanned vehicle interdiction device 100 may also include a serial interface connector (RS232, USB, etc.), which accepts a cable connected to programming equipment. The EEPROM can be programmed with authorization information using the associated programming equipment. Once the EEPROM programming is complete, the cable is disconnected, and the administrative key is removed and stored in a secure location.

In other examples, credential detector 110 utilizes communications interface 114 to query a remote database of authorized users to determine whether a user associated with access key 112 is an authorized user. Communications interface 114 receives, from the remote database, an indication whether the user associated with access key 112 is identified as an authorized user in the remote database of authorized users. Credential detector 110 validates access key 112, based on a received indication that the user associated with access key 112 is identified as an authorized user in the remote database of authorized users.

In some examples, credential detector 110 is replaced with a security mechanism, which is coupled to control unit 104 and has an interface to validate access keys. The main difference between credential detector 110 and the security mechanism is that the security mechanism is not generally configured to handle encryption involving public/private key pairs. In the examples in which a security mechanism is utilized in place of credential detector 110, the access key may be a mechanical key, a radio frequency identification (RFID) tag, a transponder key, a smart key, or an electronic card or "stick."

In examples in which the access key is a mechanical key, the mechanical key has teeth or notches designed to match those on the security mechanism (e.g., locking mechanism) on unmanned vehicle interdiction device 100. When the mechanical key is turned, it closes a circuit. Control unit 104 reads the state of that circuit and enables operation of UV interdiction mechanism 108 when a valid key is inserted. The user can check out a mechanical key along with unmanned vehicle interdiction device 100, providing the necessary link between key and user identity.

In other examples, the access key is a proximity key such as an RF identification (RFID) tag or key fob worn/carried by the user. A proximity key, such as an RFID tag or key fob, enables UV interdiction mechanism 108 if the proximity key is close enough to unmanned vehicle interdiction device 100 to be read by an RFID interrogation signal. Some examples use a high frequency tag (13.56 MHz) to limit the proximity range to under a meter. This limited range can require unmanned vehicle interdiction device 100 to be in the user's possession to be enabled. Although other frequency tags may be used, some low frequency tags may not have sufficient range for operation of a hand-held device, and ultra-high frequency tags may fall into the range of unmanned aircraft (UA) radio bands, making them subject to interruption by RF jamming from unmanned vehicle interdiction device 100.

As with the mechanical key, there can be two options for coding the proximity key. The proximity key can be specific to the device or specific to the user. In the first case, the user "checks out" an RFID key with unmanned vehicle interdiction device 100, so that there is a link between RFID key identity and user identity.

In the second case, the RFID key uniquely identifies the user, and the user identity is validated against a database of authorized users. For example, when unmanned vehicle interdiction device 100 is powered on, it activates an on-board RFID transmitter and listens for a response. Unmanned vehicle interdiction device 100 can continue to use the RFID transmitter to "ping" and listen until it reads a response. Control unit 104 can then compare the identity received in the response against the device identity (e.g., for device key) or against a database of authorized users (e.g., for operator key). If the received identity is associated with an authorized user, the proximity key is valid, and control unit 104 can enable UV interdiction mechanism 108 and start a timer. When the timer expires (e.g., after one second, one minute, one hour, or other intervals), unmanned vehicle interdiction device 100 can once again check for the presence of the proximity key. If a valid key is found, unmanned vehicle interdiction device 100 can continue operating. If no valid key is found, unmanned vehicle interdiction device 100 can disable UV interdiction mechanism 108 and continue to check for a valid proximity key while unmanned vehicle interdiction device 100 is powered on.

The second and all subsequent checks for a valid proximity key can be coordinated with UV interdiction mechanism 108 (e.g., RF jammer). When the valid key timer expires, control unit 104 can determine if UV interdiction mechanism 108 is active and delay the key interrogation until UV interdiction mechanism 108 is turned off to avoid disabling unmanned vehicle interdiction device 100 during critical operations. Control unit 104 can also coordinate received power monitoring with the proximity key interrogation. For example, while the proximity key interrogation is active, control unit 104 can ignore all power readings.

In other examples, the access key is a transponder key. Transponder devices use microchips to transmit a low-level signal from a key that is read by a remote receiver. The microchip is programmed with a unique serial number. Using RFID, the receiver must detect the correct serial number in order to unlock or open. As applied to unmanned vehicle interdiction device 100, when a transponder key is inserted into the security mechanism of unmanned vehicle interdiction device 100, a signal is sent to a receiver located within unmanned vehicle interdiction device 100. If the digital serial number in the transponder key matches the one programmed in unmanned vehicle interdiction device 100, the transponder key is validated, and UV interdiction mechanism 108 is enabled. When the transponder key is removed, UV interdiction mechanism 108 is disabled. The user can check out a transponder key along with unmanned vehicle interdiction device 100, providing the necessary link between transponder key and user identity.

In further examples, the access key is a smart key. Smart keys work similarly to transponder keys, but they are more convenient for the user. For example, a smart key is not required to be inserted into unmanned vehicle interdiction device 100. Thus, the smart key allows the user to keep the key fob in their pocket or elsewhere on their person while operating unmanned vehicle interdiction device 100. The smart key is identified via an antenna in housing 102, which receives an RF signal transmitted from a radio pulse generator in the smart key housing. In some cases, the smart key can also store customizable settings/configurations such as limitations regarding the allowable type/strength of jamming/navigation satellite signals that may be utilized by UV interdiction mechanism 108 to disrupt unmanned vehicle operations. The user can check out a smart key along with unmanned vehicle interdiction device 100, providing the necessary link between smart key and user identity.

In examples in which the access key is an electronic card or "stick" that is inserted into a slot on unmanned vehicle interdiction device 100, the access key can contain a code, which is read by an electronics circuit of the security mechanism of unmanned vehicle interdiction device 100. Control unit 104 compares this code against a fixed code specific to unmanned vehicle interdiction device 100. If the code is valid, the control unit 104 enables UV interdiction mechanism 108. If the code is not valid, UV interdiction mechanism 108 cannot be enabled. When the access key is removed, UV interdiction mechanism 108 is disabled. The user can check out an access key along with unmanned vehicle interdiction device 100, providing the necessary link between access key and user identity.

In some examples, unmanned vehicle interdiction device 100 includes recording mechanism 116 coupled to the memory to record data related to at least one of the following: operation of unmanned vehicle interdiction device 100, identification of an unmanned vehicle, location of the unmanned vehicle, and operation of the unmanned vehicle. More specifically, recording mechanism 116 may be configured to collect data related to a geographical position of unmanned vehicle interdiction device 100, the current date and time as reported by GNSS receiver 120, the compass direction (as reported by compass 122) and integrated pointing angles (pan and tilt), a compressed or full resolution snapshot captured from optical sensor 118 (e.g., a camera), the user identity associated with a validated access key. Since the data recorded by recording mechanism 116 may relate to a particular user's use or misuse of unmanned vehicle interdiction device 100, recording mechanism 116 may be designed to be tamper-resistant or tamper-proof, in some examples.

In further examples, unmanned vehicle interdiction device 100 may also include optical sensor 118 coupled to control unit 104 and recording mechanism 116 to record, in response to receiving a signal from control unit 104, at least one of the following: images and video associated with the unmanned vehicle, an identifier located on a surface of the unmanned vehicle, and a location in which the unmanned vehicle is being operated. In some examples, optical sensor 118 is a wide field of view camera to capture critical evidence of an illegally or dangerously operated unmanned vehicle. This recorded evidence includes imagery and geographical location of the target unmanned vehicle, with date and time stamps. More specifically, optical sensor 118 may be a wide field of view, high resolution color camera or other imaging device.

In some examples, unmanned vehicle interdiction device 100 also includes an audio input device such as a microphone. In these examples, the camera and microphone are connected to electronics that capture the raw video and audio signals, respectively. Additional electronics (or processing software in an embedded computer) converts the raw camera data to a displayable format, such as High-Definition Multimedia Interface (HDMI). This signal is routed to an onboard display panel, which may be included on user interface 130, in some examples. In addition, the audio and/or video signals may be compressed using a commercial algorithm, such as H.264, Moving Picture Experts Group-2 (MPEG-2), or Joint Photographic Experts Group (JPEG). The compressed signal(s) is transferred to a mass storage memory device, such as a Universal Serial Bus (USB) flash drive or micro-Secure Digital (micro-SD) card, which records the information.

In some examples, unmanned vehicle interdiction device 100 includes Global Navigation Satellite System (GNSS) receiver 120 coupled to recording mechanism 116 to record a geographical location of unmanned vehicle interdiction device 100. These examples may also include compass 122 coupled to recording mechanism 116 to record a heading of optical sensor 118. In these examples, GNSS receiver 120, digital compass 122, and a three-axis gyroscope and accelerometer work together to measure geographical location and pointing direction of unmanned vehicle interdiction device 100. In some examples, control unit 104 continuously receives the date, time, and geographical location from GNSS receiver 120. Control unit 104 also reads compass 122, angular velocities, and acceleration.

The accelerometers within unmanned vehicle interdiction device 100 measure forces, such as motion and gravity, based on electrical output from a crystal sensitive to stress from acceleration. The gyroscope within unmanned vehicle interdiction device 100 measures rotational motion using the Coriolis effect. A gyroscope contains oscillating masses, typically two or more moving in opposite directions. When unmanned vehicle interdiction device 100 is turned (e.g., an angular velocity is applied) by a user, the Coriolis force on each mass causes a capacitive change. The difference in capacitance is converted to a voltage, which is proportional to the angular velocity. The analog voltages from the accelerometers and gyroscopes passes through analog to digital convertors to produce values that can be read by control unit 104. Control unit 104 uses the three-dimensional acceleration values to measure the direction of gravity (e.g., downward) with respect to unmanned vehicle interdiction device 100. More specifically, control unit 104 integrates the measured angular velocities to compute pan and tilt angles of unmanned vehicle interdiction device 100. Digital compass 122 or a magnetometer measures magnetic fields to estimate the direction of north. By combining the up/down, pan, and tilt measurements computed from the accelerometer and gyroscope data with the magnetometer, control unit 104 determines the geographical pointing direction of unmanned vehicle interdiction device 100.

GNSS receiver 120 receives signals from four (or more) satellites that regularly transmit their position and the current time. Using trilateration, GNSS receiver 120 calculates its latitude, longitude, and altitude from the satellite position signals and their time differences. Control unit 104 periodically reads the position and time information from GNSS receiver 120. In some examples, GNSS receiver 120 may receive data from one or more geographical satellite constellations (e.g., GPS, GLONASS, Beidou, etc.).

In further examples, unmanned vehicle interdiction device 100 includes radio frequency (RF) sensor 124 coupled to recording mechanism 116 to record identification information broadcast from the unmanned vehicle in a radio frequency signal. Current FAA rules require that all unmanned aircraft display a registration number that is legible on close examination. Due to the small size of these aircraft, the registration number cannot be read from a distance, even with stabilized long-range cameras. Consequently, there is significant interest both by the FAA and in the UAS community for the capability equivalent of the transponder required in larger manned aircraft. The transponder on a manned aircraft broadcasts an identity code assigned by local air traffic control and altitude when interrogated by air traffic control. The interrogation occurs on 1030 MHz, and commercial transponders reply on 1090 MHz. All UASs were required to have an Automatic Dependent Surveillance-Broadcast (ADS-B) receiver by 2020, but there is currently no requirement for carrying a transceiver. The FAA is in the process of defining transponder requirements for both small and large UASs, but no formal specification has been released.

Despite the current lack of a formal transponder requirement for unmanned vehicles, unmanned vehicle interdiction device 100 can include a directional receiver (e.g., RF sensor 124) capable of reading transponder type signals, in some examples. This equipment may be a custom receiver capable of reading identity information broadcast from official support UASs in an RF signal. The receiver may also be a radio receiver capable of reading a proprietary wireless signal (e.g., a code-division multiple access (CDMA) electronic serial number). For example, one variation could include a receiver for FAA compliant transponder signals.

In other examples, unmanned vehicle interdiction device 100 can include an electro-optical sensor 126 coupled to recording mechanism 116 to record identification information broadcast from the unmanned vehicle in at least one of the following: a visible signal, a near-infrared signal, and a thermal laser signal. Electro-optical sensor 126 may be a camera capable of reading a visible signal, an infrared signal, a near-infrared signal, a laser, and/or light-emitting diode(s).

Control unit 104 can listen for and interpret transponder signals whenever it is also monitoring the UAS radio bands. Control unit 104 can extract the unique UAS identifier from the transponder signal. This value may be the registration number, serial number, or some other identifier. Control unit 104 may use this number to index an on-board database of authorized aircraft. The database can be stored in an EEPROM on unmanned vehicle interdiction device 100 and loaded from the FAA database by authorized personnel, using the same procedure and equipment as described above when programming authorized users. When control unit 104 identifies an authorized UAS, it can automatically record a set of event data, as well as the unmanned vehicle's unique identifier.

Figure 2:
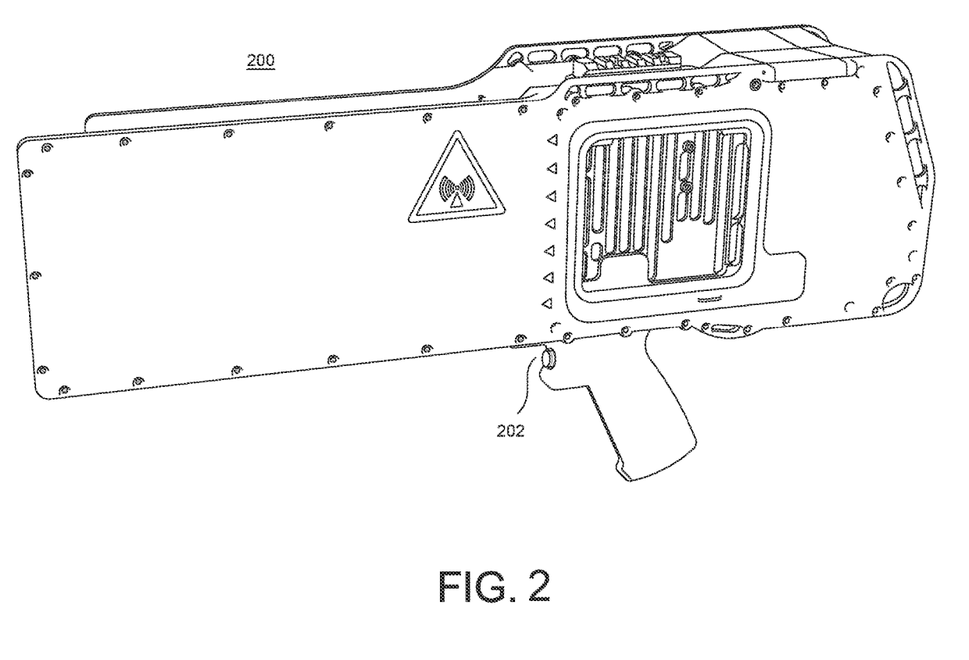
FIG. 2 is a side-view schematic illustration of an example unmanned vehicle interdiction device having a housing that is suitable for a single user to hold and operate the unmanned vehicle interdiction device.

There are a number of scenarios in which unmanned vehicle interdiction device 100 records or logs data. In some examples, recording mechanism 116 is configured to automatically log information related to operation of unmanned vehicle interdiction device 100 by the authorized user, in response to activation of unmanned vehicle interdiction mechanism 108. Unmanned vehicle interdiction mechanism 108 is activated when an authorized user depresses and holds down trigger 128 on unmanned vehicle interdiction device 100. The example of FIG. 2 shows trigger 202 located on the upper front portion of a grip of unmanned vehicle interdiction device 200. In some examples, recording mechanism 116 automatically stops logging data once trigger 128 is released by the authorized user.

In some examples, recording mechanism 116 is configured to log information related to a current operational state of unmanned vehicle interdiction device 100 upon receipt of an input from an authorized user that indicates a request to log information. For example, an authorized user may submit an input, via a button, knob, switch, dial, touchscreen, etc. on user interface 310 or elsewhere on unmanned vehicle interdiction device 100, to indicate a request to log the current operational state (e.g., a snapshot) of unmanned vehicle interdiction device 100. In some examples, recording mechanism 116 can log the current operational state of unmanned vehicle interdiction device 100 and stop logging data pursuant to the authorized user's request. In other examples, recording mechanism 116 can continue logging the ongoing operational state of unmanned vehicle interdiction device 100 and not stop logging data until the authorized user submits a request to stop logging the ongoing operational state of unmanned vehicle interdiction device 100. In some examples, the authorized user submits the request to stop logging by pressing or actuating the same input mechanism that was used to request logging the ongoing operational state of unmanned vehicle interdiction device 100.

In some examples, recording mechanism 116 is configured to record information related to a current operational state of at least one unmanned vehicle operating within range of unmanned vehicle interdiction device 100, upon receipt of an input from the authorized user that indicates a request to log information. For example, an authorized user may submit an input, via a button, knob, switch, dial, touchscreen, etc. on user interface 310 or elsewhere on unmanned vehicle interdiction device 100, to indicate a request to log the current operational state (e.g., a snapshot) of at least one unmanned vehicle. In some examples, recording mechanism 116 can log the current operational state of the at least one unmanned vehicle and stop logging data pursuant to the authorized user's request. In other examples, recording mechanism 116 can continue logging the ongoing operational state of the at least one unmanned vehicle and not stop logging data until the authorized user submits a request to stop logging the ongoing operational state of the at least one unmanned vehicle. In some examples, the authorized user submits the request to stop logging by pressing or actuating the same input mechanism that was used to request logging the ongoing operational state of the at least one unmanned vehicle.

In some examples, recording mechanism 116 is configured to automatically log information related to at least one of the following: identification of an unmanned vehicle, location of the unmanned vehicle, and operation of the unmanned vehicle, in response to activation of unmanned vehicle interdiction mechanism 108. Unmanned vehicle interdiction mechanism 108 is activated when an authorized user depresses and holds down trigger 128 on unmanned vehicle interdiction device 100. The example of FIG. 2 shows trigger 202 located on the upper front portion of a grip of unmanned vehicle interdiction device 200. In some examples, recording mechanism 116 automatically stops logging data once trigger 128 is released by the authorized user.

In some examples, recording mechanism 116 is configured to, in response to detection of an unmanned vehicle by unmanned vehicle detection mechanism 106, automatically log information related to at least one of the following: identification of the unmanned vehicle, location of the unmanned vehicle, and operation of the unmanned vehicle. As discussed above, unmanned vehicle interdiction device 100 can detect an unmanned vehicle in a variety of manners, including detection of control, video, and telemetry signals or transponder signals associated with unmanned vehicles.

In further examples, communications interface 114 of unmanned vehicle interdiction device 100 may be configured to communicate, via a Bluetooth communication link, with law enforcement, firefighter, or first responder communication equipment capable of requesting information from a government UAS registry database. For example, a user would use the Bluetooth connection to request information on a specific UAS identifier. Controls on user interface 130 can allow the user to select an identity value shown on the display panel. Unmanned vehicle interdiction device 100 can then connect to equipment authorized to query the UAS registry database and request further information on that identity value. Received information can be displayed to the user via user interface 130.

Bluetooth wireless communications operate in the 2.4 GHz bands. Consequently, communication over Bluetooth can interfere with UAS detection operation, as it will overload the 2.4 GHz receiver. Consequently, detection operations can be coordinated with the use of Bluetooth communications. For example, a short-term wireless connection can be made by control unit 104 when the user requests information on a UAS identifier. The controls to establish a Bluetooth connection can be inactive whenever UV interdiction mechanism 108 is on, and any existing link can be immediately terminated when UV interdiction mechanism 108 is activated. Control unit 104 can also coordinate communication with received power monitoring. Thus, received power in the wireless communication band that is being utilized for unmanned vehicle detection can be ignored whenever a Bluetooth link is active.

Figure 3:
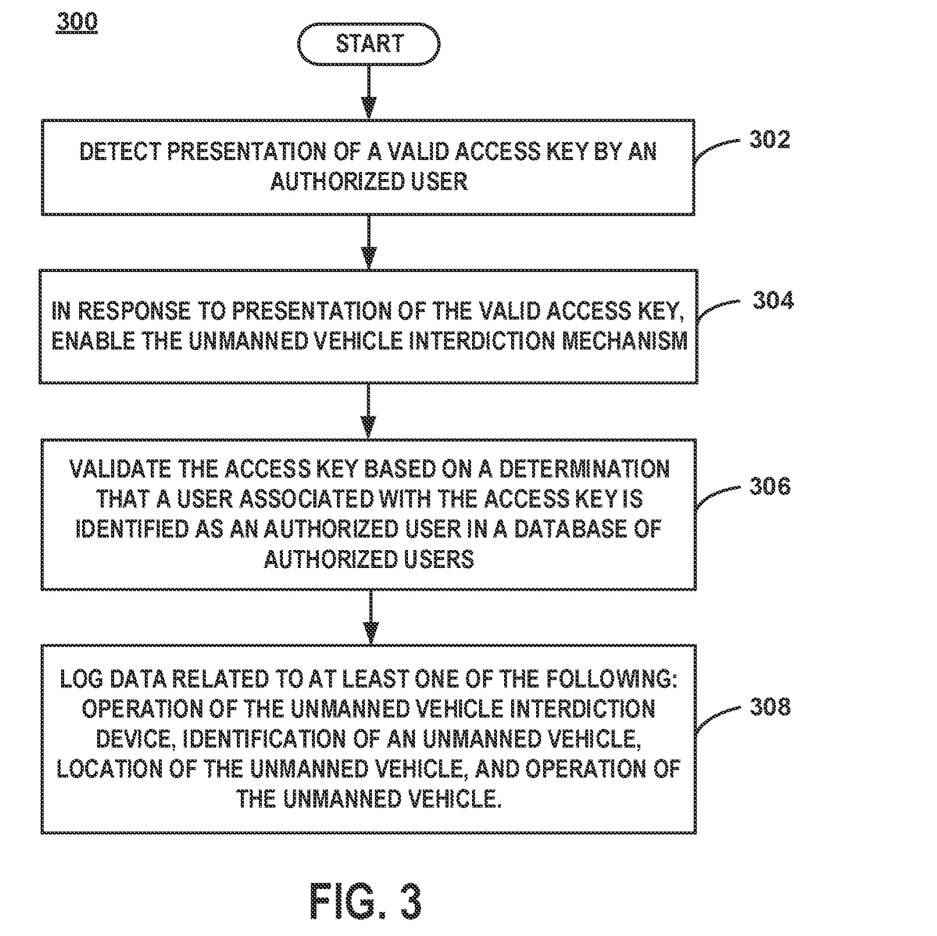
FIG. 3 is a flowchart of an example of a method in which an unmanned vehicle interdiction device detects the presentation of a valid access key by an authorized user and, in response to presentation of the valid access key, enables an unmanned vehicle interdiction mechanism.

FIG. 3 is a flowchart of an example of a method in which an unmanned vehicle interdiction device detects the presentation of a valid access key by an authorized user and, in response to presentation of the valid access key, enables an unmanned vehicle interdiction mechanism. The method 300 is performed at an unmanned vehicle interdiction device comprising an unmanned vehicle detection mechanism and an unmanned vehicle interdiction mechanism configured to selectively emit signals to disrupt operation of an unmanned vehicle. Method 300 begins with detecting the presentation of a valid access key by an authorized user, 302. In response to presentation of the valid access key, the unmanned vehicle interdiction mechanism is enabled, 304. The access key is validated based on a determination that a user associated with the access key is identified as an authorized user in a database of authorized users, 306. The unmanned vehicle interdiction device logs data related to at least one of the following: operation of the unmanned vehicle interdiction device, identification of an unmanned vehicle, location of the unmanned vehicle, and operation of the unmanned vehicle, 308. In some examples, the data is automatically logged in response to activation of the unmanned vehicle interdiction mechanism. In other examples, the data is automatically logged in response to detection of an unmanned vehicle by the unmanned vehicle detection mechanism.

In other examples, one or more of the steps of method 300 may be omitted, combined, performed in parallel, or performed in a different order than that described herein or shown in FIG. 3. In still further examples, additional steps may be added to method 300 that are not explicitly described in connection with the example shown in FIG. 3. Similarly, any of the features of any of the methods described herein may be performed in parallel or performed in a different manner/order than that described or shown herein.

Clearly, other examples and modifications of the foregoing will occur readily to those of ordinary skill in the art in view of these teachings. The above description is illustrative and not restrictive. The examples described herein are only to be limited by the following claims, which include all such examples and modifications when viewed in conjunction with the above specification and accompanying drawings. The scope of the foregoing should, therefore, be determined not with reference to the above description alone, but instead should be determined with reference to the appended claims along with their full scope of equivalents.

What is claimed is:

1. An unmanned vehicle interdiction device comprising: a hand-held housing encapsulating:
    a control unit comprising memory and at least one processor;
    an unmanned vehicle interdiction mechanism coupled to the control unit to selectively emit signals to disrupt operation of an unmanned vehicle; and
    a credential detector coupled to the control unit having an interface to detect and validate access keys,
    wherein the control unit, in response to receiving a signal from the credential detector indicating that an access key has been validated, sends a signal to enable the unmanned vehicle interdiction mechanism.

2. The unmanned vehicle interdiction device of claim 1, wherein the memory stores a database of authorized users of the unmanned vehicle interdiction device, the credential detector validating the access key based on whether a user associated with the access key is identified as an authorized user in the database of authorized users.

3. The unmanned vehicle interdiction device of claim 1, further comprising:
    a communications interface configured to:
        query a remote database of authorized users to determine whether a user associated with the access key is an authorized user, and
        receive an indication that the user associated with the access key is identified as an authorized user in the remote database of authorized users,
    the credential detector validating the access key based on the received indication that the user associated with the access key is identified as an authorized user in the remote database of authorized users.

4. The unmanned vehicle interdiction device of claim 1, wherein the unmanned vehicle interdiction mechanism comprises at least one of the following: a radio frequency jammer, a Global Navigation Satellite System (GNSS) signal replacement mechanism, and a signal generator configured to generate signals from a simulated satellite constellation that conflict with signals from an actual satellite constellation.

5. The unmanned vehicle interdiction device of claim 1, wherein the access key comprises a Common Access Card (CAC).

6. The unmanned vehicle interdiction device of claim 1, wherein the access key comprises a Personal Identity Verification (PIV) credential.

7. The unmanned vehicle interdiction device of claim 1, wherein the access key comprises a key that contains an identity of a user encrypted with a public key of the unmanned vehicle interdiction device.

8. The unmanned vehicle interdiction device of claim 1, wherein the access key comprises a key that contains an identity of a user encrypted with a private key of the user.

9. The unmanned vehicle interdiction device of claim 1, further comprising:
    a recording mechanism coupled to the memory to record data related to at least one of the following: operation of the unmanned vehicle interdiction device, identification of an unmanned vehicle, location of the unmanned vehicle, and operation of the unmanned vehicle.

10. The unmanned vehicle interdiction device of claim 9, further comprising:
    an optical sensor coupled to the control unit and the recording mechanism to record, in response to receiving a signal from the control unit, at least one of the following: images and video associated with the unmanned vehicle, an identifier located on a surface of the unmanned vehicle, and a location in which the unmanned vehicle is being operated.

11. The unmanned vehicle interdiction device of claim 10, further comprising:
a Global Navigation Satellite System (GNSS) receiver coupled to the recording mechanism to record a geographical location of the unmanned vehicle interdiction device; and
a compass coupled to the recording mechanism to record a heading of the optical sensor.

12. The unmanned vehicle interdiction device of claim 9, further comprising:
a radio frequency sensor coupled to the recording mechanism to record identification information broadcast from the unmanned vehicle in a radio frequency signal.

13. The unmanned vehicle interdiction device of claim 9, further comprising:
an electro-optical sensor coupled to the recording mechanism to record identification information broadcast from the unmanned vehicle in at least one of the following: a visible signal, a near-infrared signal, and a thermal laser signal.

14. The unmanned vehicle interdiction device of claim 9, wherein the recording mechanism is configured to:
in response to activation of the unmanned vehicle interdiction mechanism, automatically log information related to operation of the unmanned vehicle interdiction device by a authorized user.

15. The unmanned vehicle interdiction device of claim 9, wherein the recording mechanism is configured to:
upon receipt of an input from a authorized user that indicates a request to log information, log information related to a current operational state of the unmanned vehicle interdiction device.

16. The unmanned vehicle interdiction device of claim 9, wherein the recording mechanism is configured to:
upon receipt of an input from a authorized user that indicates a request to log information, record information related to a current operational state of at least one unmanned vehicle operating within range of the unmanned vehicle interdiction device.

17. The unmanned vehicle interdiction device of claim 9, wherein the recording mechanism is configured to:
in response to activation of the unmanned vehicle interdiction mechanism, automatically log information related to at least one of the following: identification of an unmanned vehicle, location of the unmanned vehicle, and operation of the unmanned vehicle.

18. The unmanned vehicle interdiction device of claim 9, further comprising:
an unmanned vehicle detection mechanism coupled to the control unit configured to detect at least one of the following signals that are associated with an unmanned vehicle: a control signal, a video signal, and a telemetry signal.

19. The unmanned vehicle interdiction device of claim 18, wherein the recording mechanism is configured to, in response to detection of an unmanned vehicle by the unmanned vehicle detection mechanism, automatically log information related to at least one of the following: identification of the unmanned vehicle, location of the unmanned vehicle, and operation of the unmanned vehicle.

20. An unmanned vehicle interdiction device comprising:
a hand-held housing encapsulating:
a control unit comprising memory and at least one processor;
an unmanned vehicle interdiction mechanism coupled to the control unit to selectively emit signals to disrupt operation of an unmanned vehicle; and
a security mechanism coupled to the control unit having an interface to validate access keys,
wherein the control unit, in response to receiving a signal from the security mechanism indicating that an access key has been validated, sends a signal to enable the unmanned vehicle interdiction mechanism.

21. The unmanned vehicle interdiction device of claim 20, wherein the access key comprises a mechanical key.

22. The unmanned vehicle interdiction device of claim 20, wherein the access key comprises a radio frequency identification (RFID) tag.

23. The unmanned vehicle interdiction device of claim 20, wherein the access key comprises a transponder key.

24. The unmanned vehicle interdiction device of claim 20, wherein the access key comprises a smart key.

25. The unmanned vehicle interdiction device of claim 20, wherein the access key comprises an electronic card or stick.

26. An unmanned vehicle interdiction device comprising:
a hand-held housing encapsulating:
a control unit comprising memory and at least one processor;
an unmanned vehicle interdiction mechanism coupled to the control unit to selectively emit signals to disrupt operation of an unmanned vehicle; and
a means for validating access keys coupled to the control unit, wherein the control unit, in response to receiving a signal from the means for validating access keys indicating that an access key has been validated, sends a signal to enable the unmanned vehicle interdiction mechanism.

27. The unmanned vehicle interdiction device of claim 26, wherein the means for validating access keys validates the access key based on whether a user associated with the access key is identified as an authorized user in a database of authorized users.

28. The unmanned vehicle interdiction device of claim 26, further comprising:
a recording mechanism coupled to the memory to record data related to at least one of the following: operation of the unmanned vehicle interdiction device, identification of an unmanned vehicle, location of the unmanned vehicle, and operation of the unmanned vehicle.

29. The unmanned vehicle interdiction device of claim 28, wherein the recording mechanism is configured to automatically log data in response to activation of the unmanned vehicle interdiction mechanism.

30. The unmanned vehicle interdiction device of claim 28, further comprising:
an unmanned vehicle detection mechanism coupled to the control unit configured to detect at least one of the following signals that are associated with an unmanned vehicle: a control signal, a video signal, and a telemetry signal,
wherein the recording mechanism is configured to automatically log data in response to detection of an unmanned vehicle by the unmanned vehicle detection mechanism.

* * * * *